United States Patent Office 3,508,174
Patented Apr. 21, 1970

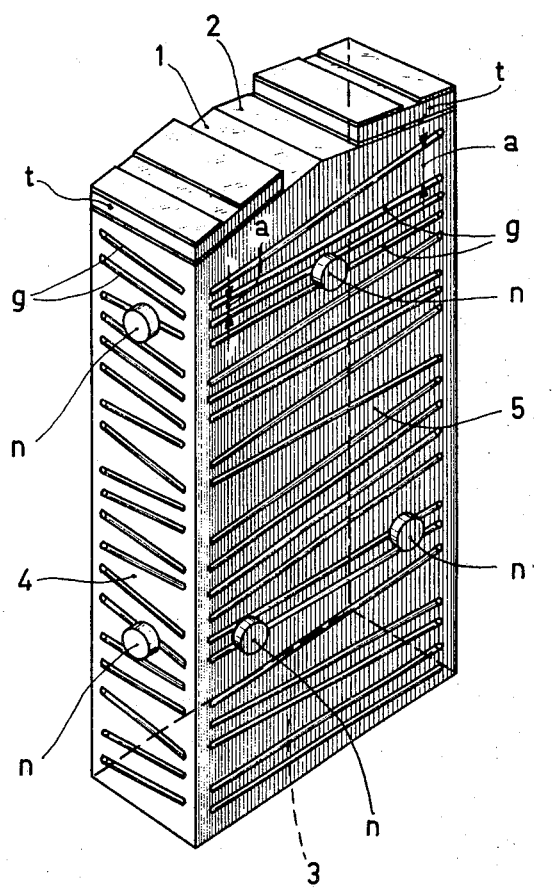

3,508,174
ULTRASONIC DELAY BODY
Franciscus Theodorus Backers and Franciscus Arnoldus Ludovicus Suijkerbuijk, Emmasingel, Eindhoven, Netherlands, assignors, by mesne assignments, to U.S. Philips Corporation, New York, N.Y., a corporation of Delaware
Filed Feb. 23, 1967, Ser. No. 618,159
Claims priority, application Netherlands, Mar. 31, 1966, 6604240
Int. Cl. H03h 7/30
U.S. Cl. 333—30                                         6 Claims

ABSTRACT OF THE DISCLOSURE

An ultrasonic delay line comprising a glass body having one or more faces provided with molded grooves and lugs. The molded grooves are irregularly spaced to reduce undesired reflections within the delay body.

---

The present invention relates to an ultrasonic delay body made of glass and provided with a transmitting and a receiving transducer for converting electric oscillations into mechanical virbrations, and visa versa. The transducers are provided on given faces of the delay body such that the oscillations orginating from the transmitting transducer are first reflected off of at least one other face of the delay body before they strike the receiving transducer.

Such delay bodies are used, for example, for transmitting wide-band electric signals with an accurate delay time, such as color television signals or digital signals for calculating machines. The ultrasonic vibrations originating from the transmitting transducer pass through the glass body, are reflected at one or more faces of this body and finally strike the receiving transducer. The time required for the vibrations to pass from the transmitting transducer to the receiving transducer constitutes the desired delay time. In practice, a high value is set upon the condition that this delay time can be accurately adjusted and is further substantially insensitive to temperature variations. By a suitable choice the material of the glass and/or of the transducers, the influence of temperature can be eliminated as far as possible. In general, the delay time is adjusted by adjusting the length of the acoustic path covered by the vibrations through the delay body by re-grinding the glass.

It is found in practice that great difficulties are involved in the manufacture of such delay bodies. More particularly, all kinds of reflections may be produced due to which a transmission characteristic curve is measured in the transmission from the transmitting transducer to the receiving transducer which is not sufficiently flat, i.e. frequency-independent, for the intended uses. In order to avoid undesirable reflections, it has been suggested to roughen or to scratch the walls of the delay body which are not intended to support the transducers or to reflect the ultrasonic vibrations so that they reflect the acoustic vibrations only to a small extent. Such a method is circuitous and time consuming.

The invention is characterized in that further faces of the delay body are provided with elevations and/or depressions obtained by a molding operation. According to a further feature of the invention, the grooves in said further faces of the delay body are arranged so that the relative distances therebetween vary and are at least of an order of magnitude equal to the depth of the grooves. Furthermore, according to a further feature of the invention, the relevant faces of the delay body may be provided with small lugs or upright walls obtained by the molding operation. These lugs may be ground to form a desired reference plane for the further grinding treatment without the grooves being ground away.

The invention will now be described with reference to the drawing, which shows an embodiment of an ultrasonic delay body in accordance with the invention.

The figure shows an ultrasonic delay body which is made of glass having faces 1 and 2 which support a transmitting and a receiving transducer, respectively. The ultrasonic vibrations emitted by the transmitting transducer are reflected at a face 3 of the delay body and then strike the receiving transducer. The remaining faces of the delay body are provided, according to the invention, with grooves g, while moreover two of these faces, viz, the faces 4 and 5, are provided with protuberances of lugs n which play an important part in the manufacture of a delay body of the described kind.

The starting material for the fabrication of the delay body is a piece of hot and hence ductile glass of a composition such that the influence of temperature on the delay time produced may be expected to be small. The molten glass is introduced into a mold having walls which are provided with ribs. When the glass is cooled and removed from the mold, the ribs give rise to the formation of the grooves g. The walls of the press or mold also contain small niches so that after the molding operation is finished, lugs n are formed on the glass body.

The block of pressed glass thus obtained is first subjected to a grinding treatment in which the lugs n on the face 5 are ground away to such an extent that the planes of these lugs coinside. Subsequently, the lugs on the face 4 are subjected to a similar treatment. The glass body bearing by the lugs n of the face 5 on a flat supporting plate and by the lugs of the face 4 on a flat stop is then arranged at an accurately fixed angle to a grinding stone by means of which the face 1 is ground. The face 1 is substantially at right angles to the plane defined by the lugs of the face 5. The angle of this face 1 to the plane defined by the lugs of the face 4 slightly exceeds 90°. The face 2 is then ground, this face likewise being substantially at right angles to the plane defined by the lugs of the face 5 and its angle to the plane defined by the lugs of the face 4 being smaller than 90°. The former angle, for example, is approximately 96° and the latter angle is approximately 84°.

After these grinding operations, the transducers are provided on the faces 1 and 2. For example, plates t are applied to the faces 1 and 2 by vapor depositing thin metal layers of piezoelectric material, for example, a titanate or zirconate from the alkaline earth sequence— which are themselves also provided with thin metal layers—are then soldered to these metal layers and provided with connecting electrodes. The plates have been subjected beforehand to a high electric field so that a remanent state of polarization is maintained therein. Preferably, two layers are applied by vapour deposition to each of the faces 1 and 2 so that there are formed on each of the plates two pairs of electrodes. The electrodes may be electrically series connected so that a more satisfactory adaptation to an input signal source and to an output impedance may be obtained, while nevertheless the ultrasonic vibriations of each half of a transducer extend parallel and in the same phase.

Subsequently, the face 3 is ground, the planes defined by the lugs n again serving as reference planes. The plane 3 is preferably at right angles to the planes defined by these lugs n. The face 3 is subjected to the grinding treatment until the delay time measured by electric means connected to the transducers t has attained the correct value. This method affords the great advantage that the delay time can be adjusted without depending upon tolerances in the glass composition and in the molding operation.

As already stated, the grooves g are obtained by the same molding operation as the whole block of glass. Their relative distances a and their positions exhibit irregular tolerances at least of an order equal to the depth of the grooves g. For example, they have a depth of 1 mm. and the distance a may vary between 1 mm. and 6 mms. The grooves g extend substantially parallel to the line intersecting the face 3, on the understanding, however, that the difference in the distance from one end and from the other end of one groove to the said line of intersection may likewise vary between 1 mm. and 6 mms. Thus, the grooves g generally do not extend accurately parallel to each other.

As is known, the ultrasonic reflections of the ultrasonic wave produced at these grooves extinguish each other substantially completely before they strike the receiving transducer at the face 2 so that they cannot adversely affect the transmission characteristic curve to be measured electrically between the transducers t on the faces 1 and 2, respectively. If the lugs n obtained by the same molding operation and projecting, for example, by approximately 2 mms. above the relevant surfaces, should be omitted, either special clamping devices would have to be used in order to obtain a reference point between the positions of the faces 1 and 2 with respect to the face 3 to be adjusted afterwards (after the application of the transducers t) or the faces 4 and 5 would have to be entirely ground to flatness so that the grooves g would also be ground away partly, which would eliminate at least in part the effect of said grooves, viz. the suppression of undesirable reflections.

What is claimed is:

1. An ultrasonic delay device comprising a glass delay body having a plurality of faces, a transmitting and a receiving electromechanical transducer mounted on given faces of the delay body such that ultrasonic vibrations emanating from the transmitting transducer are reflected from another face of the delay body before striking the receiving transducer, at least two other faces of said delay body containing a plurality of grooves and a plurality of projecting lugs formed during a molding operation.

2. A device as claimed in claim 1 wherein the grooves in each face are non-parallel but extend in the same general direction with different spacings therebetween of an order of magnitude equal to the depth of the grooves.

3. A device as claimed in claim 1 wherein said lugs are ground flat.

4. An ultrasonic delay device comprising a multi-surfaced solid delay body having a transmitting surface and a receiving surface arranged so that ultrasonic vibrations emanating from the transmitting surface are first reflected off another surface of the delay body before returning to the receiving surface, first and second electromechanical transducers coupled to said transmitting and receiving surfaces, respectively, said body including at least two other surfaces containing a plurality of non-parallel grooves and a plurality of projecting lugs.

5. A delay device as claimed in claim 4 wherein said delay body is approximately rectangular in shape and said transmitting and receiving surfaces are located at the same end of the delay body.

6. An ultrasonic delay device comprising a glass delay body having a plurality of faces, first and second faces of said body being adapted to act as a transmitting face and a receiving face, respectively, for ultrasonic vibrations, said first and second faces being arranged so that ultrasonic vibrations emanating from the transmitting face are reflected from another face of the delay body before returning to the receiving face, said body having at least two other faces containing a plurality of grooves and a plurality of projecting lugs.

References Cited

UNITED STATES PATENTS 2,505,515   4/1950   Arenberg _____ 333—30

HERMAN K. SAALBACH, Primary Examiner

T. VEZEAU, Assistant Examiner